(12) United States Patent
Böning et al.

(10) Patent No.: US 11,060,453 B2
(45) Date of Patent: Jul. 13, 2021

(54) TURBOCHARGER WITH PREDETERMINED BREAKING POINT FOR AN INTERNAL COMBUSTION ENGINE

(71) Applicant: VITESCO TECHNOLOGIES GMBH, Hannover (DE)

(72) Inventors: Ralf Böning, Reiffelbach (DE); Michael Klaus, Tegernheim (DE); Dirk Frankenstein, Flörsheim-Dalsheim (DE); Bernhard Lehmayr, Regensburg (DE); Bruno Ferling, Beindersheim (DE)

(73) Assignee: Vitesco Technologies GmbH, Hannover (DE)

( * ) Notice: Subject to any disclaimer, the term of this patent is extended or adjusted under 35 U.S.C. 154(b) by 0 days.

(21) Appl. No.: 16/663,732

(22) Filed: Oct. 25, 2019

(65) Prior Publication Data

US 2020/0056542 A1 Feb. 20, 2020

Related U.S. Application Data

(63) Continuation of application No. PCT/EP2018/059299, filed on Apr. 11, 2018.

(30) Foreign Application Priority Data

Apr. 28, 2017 (DE) ..................... 10 2017 207 173.7

(51) Int. Cl.
*F02C 6/12* (2006.01)
*F02B 39/16* (2006.01)

(52) U.S. Cl.
CPC ............... *F02C 6/12* (2013.01); *F02B 39/16* (2013.01)

(58) Field of Classification Search
CPC ...... F02C 6/12; F02C 7/06; F02C 7/28; F02B 39/16; F05D 2220/40; F05D 2230/237;
(Continued)

(56) References Cited

U.S. PATENT DOCUMENTS

2004/0022648 A1 2/2004 Cabrales et al.
2010/0192570 A1 8/2010 Schlienger et al.
(Continued)

FOREIGN PATENT DOCUMENTS

DE 102010043198 A1 5/2012
DE 102012205043 A1 10/2013
(Continued)

OTHER PUBLICATIONS

Robert Flitney, Seals and Sealing Handbook, 2014, Butterworth-Heinemann, Sixth edition, 245 (Year: 2014).*
(Continued)

*Primary Examiner* — Audrey K Bradley
*Assistant Examiner* — Edward Bushard

(57) ABSTRACT

Disclosed is a turbocharger for an internal combustion engine, having a bearing housing. A turbocharger rotor is mounted to be rotatable in the bearing housing about the rotor axis of rotation of its rotor shaft, wherein a turbine wheel is arranged for conjoint rotation on the rotor shaft and in a turbine housing fixed on the bearing housing. Between the rotor shaft and the bearing housing, an oil seal for sealing the bearing housing with respect to the turbine housing is arranged between the turbine wheel and a radial bearing associated with the turbine wheel in order to seal the bearing housing with respect to the turbine housing. A predetermined breaking point is formed for the turbocharger rotor of the turbocharger which lies in a breaking point region and extends axially between the turbine wheel back and an axial end, facing the turbine wheel back, of the rotor-shaft oil seal.

20 Claims, 3 Drawing Sheets

(58) Field of Classification Search
CPC .... F05D 2230/238; F01D 5/025; F01D 5/026; F01D 21/04; F01D 21/10
See application file for complete search history.

(56) References Cited

U.S. PATENT DOCUMENTS

| | | |
|---|---|---|
| 2012/0076639 A1 | 3/2012 | Vazeille et al. |
| 2013/0294947 A1 | 11/2013 | Schlienger et al. |
| 2015/0023785 A1 | 1/2015 | Stanko et al. |
| 2015/0104318 A1 | 4/2015 | Koch et al. |
| 2016/0010492 A1* | 1/2016 | Cavagnaro ................ F01D 5/02 417/423.1 |

FOREIGN PATENT DOCUMENTS

| | | |
|---|---|---|
| DE | 102013005167 B3 | 9/2014 |
| EP | 2216516 A1 | 8/2010 |
| EP | 2821618 A1 | 1/2015 |

OTHER PUBLICATIONS

International Search Report and Written Opinion dated 21 Jun. 2018 from corresponding International Patent Application No. PCT/EP2018/059299.
German Search Report dated Mar. 6, 2018 for corresponding German Patent Application No. 10 2017 207 173.7.

* cited by examiner

TURBOCHARGER WITH PREDETERMINED BREAKING POINT FOR AN INTERNAL COMBUSTION ENGINE

CROSS REFERENCE TO RELATED APPLICATIONS

This application claims the benefit of PCT Application PCT/EP2018/059299, filed Apr. 11, 2018, which claims priority to German Application DE 10 2017 207 173.7, filed Apr. 28, 2017. The disclosures of the above applications are incorporated herein by reference.

FIELD OF INVENTION

The invention relates to a turbocharger with a predetermined breaking point on the turbocharger rotor for an internal combustion engine.

BACKGROUND

Exhaust-gas turbochargers are increasingly being used to increase power in motor vehicle internal combustion engines. More and more frequently, this is done with the aim of reducing the overall size and weight of the internal combustion engine for the same power or even increased power and, at the same time, of reducing consumption and thus $CO_2$ emissions, with regard to ever stricter legal requirements in this respect. The principle of action consists in using the energy contained in the exhaust-gas flow to increase a pressure in an intake tract of the internal combustion engine and thus to bring about better filling of a combustion chamber of the internal combustion engine with atmospheric oxygen. In this way, more fuel, such as gasoline or diesel, can be converted in each combustion process, i.e. the power of the internal combustion engine can be increased.

To this end, the exhaust-gas turbocharger has an exhaust-gas turbine arranged in the exhaust tract of the internal combustion engine, a fresh-air compressor arranged in the intake tract and a rotor bearing arranged therebetween. The exhaust-gas turbine has a turbine housing and a turbine impeller arranged therein, which is driven by the exhaust-gas mass flow. The fresh-air compressor has a compressor housing and a compressor impeller arranged therein, which builds up a boost pressure. The turbine impeller and the compressor impeller are arranged for conjoint rotation on the opposite ends of a common shaft, referred to as the rotor shaft, and thus form what is referred to as the turbocharger rotor. The rotor shaft extends axially between the turbine impeller and compressor impeller through the rotor bearing arranged between the exhaust-gas turbine and fresh-air compressor, and is rotatably mounted in said rotor bearing in the radial and axial directions in relation to the rotor shaft axis. According to this construction, the turbine impeller driven by the exhaust-gas mass flow drives the compressor impeller via the rotor shaft, thereby increasing the pressure in the intake tract of the internal combustion engine behind the fresh-air compressor in relation to the fresh-air mass flow, and thereby ensuring better filling of the combustion chamber with atmospheric oxygen.

FIG. 1 schematically shows a sectional illustration of an example of an exhaust-gas turbocharger 1, which has an exhaust-gas turbine 20, a fresh-air compressor 30 and a rotor bearing 40. The exhaust-gas turbocharger 1 illustrated has a multi-part construction. Here, a turbine housing 21 that is arrangeable in the exhaust tract of the internal combustion engine, a compressor housing 31 that is arrangeable in the intake tract of the internal combustion engine, and, between the turbine housing 21 and compressor housing 31, a bearing housing 41 are arranged alongside one another with respect to the common turbocharger axis 2 and connected together in terms of assembly.

The exhaust-gas turbine 20 is equipped with a wastegate valve 29 and an exhaust-gas mass flow AM is indicated by arrows. The fresh-air compressor 30 has an overrun air recirculation valve 39 and a fresh-air mass flow FM is likewise indicated by arrows. A turbocharger rotor 10, as it is known, of the exhaust-gas turbocharger 1 has a turbine impeller 12 (also referred to as turbine wheel), a compressor impeller 13 (also referred to as compressor wheel) and a rotor shaft 14. The turbocharger rotor 10 rotates about a rotor axis of rotation 15 of the rotor shaft 14 during operation. The rotor axis of rotation 15 and at the same time the turbocharger axis 2 (also referred to as longitudinal axis) are illustrated by the indicated centerline and identify the axial orientation of the exhaust-gas turbocharger 1.

The bearing housing 41 is arranged axially between the turbine housing 21 and the compressor housing 31. The rotor shaft of the turbocharger rotor 10 and the required bearing arrangement having radial bearings 42 for the rotatable mounting and an axial bearing disk 43 for the axial mounting of the rotor shaft 14 are accommodated in the bearing housing 41.

A further structural unit of the exhaust-gas turbocharger 1 is represented by the turbocharger rotor 10, which has the rotor shaft 14, the turbine impeller 12, which is arranged in the turbine housing 21, and the compressor impeller 13, which is arranged in the compressor housing 31. The turbine impeller 12 and the compressor impeller 13 are arranged on the opposite ends of the common rotor shaft 14 and connected for conjoint rotation thereto. The rotor shaft 14 extends in the direction of the turbocharger axis 2 axially through the bearing housing 41 and is mounted axially and radially therein so as to be rotatable about its longitudinal axis, the rotor axis of rotation 15, wherein the rotor axis of rotation 15 coincides with the turbocharger axis 2.

The design configuration of a conventional exhaust-gas turbocharger 1 generally requires a multi-part construction of the turbocharger rotor 10. At the same time, considerable torques must be transmitted at very high speeds (some 10,000 to over 100,000 revolutions per minute) via the rotor shaft 14. Moreover, the turbocharger rotor 10 is subject to alternating thermal stress by temperatures of as much as 1000° C. and above during operation, especially on the side of the turbine impeller 12. Furthermore, the moment of inertia of the turbocharger rotor 10 must be minimized to enable rapid adaptation of the speed to the changing operating conditions to be ensured. In addition, different materials are used for the turbine impeller 12, the compressor impeller 13 and the rotor shaft 14, wherein the turbine impeller 12 and the rotor shaft 14 are generally welded to one another, and the compressor impeller 13, together with the components of the turbocharger rotor 10 which are described below, is clamped on the rotor shaft 14 by means of a clamping nut 19.

To mount the rotor shaft 14, which is usually composed of a steel material, in the bearing housing 41, a bearing arrangement is normally pre-mounted on the rotor shaft 14 and then installed in the bearing housing 41 together with the rotor shaft 14. In the example, this bearing arrangement comprises a radial bearing associated with the compressor side, that is to say a compressor-side radial bearing 42, and a radial bearing associated with the turbine side, that is to say a turbine-side radial bearing 42, and the axial counter bearing 44, which is associated with the compressor side and is arranged on the rotor shaft 14 in the vicinity of the compressor-side radial bearing 42. Arranged between the two radial bearings 42 is a bearing spacer sleeve 17, which ensures a defined spacing between the two radial bearings 42. In this case, the bearings can preferably be embodied as plain bearings or rolling bearings and can be mounted on the rotor shaft individually or, alternatively, combined in a "bearing cartridge".

Finally, a sealing ring bush 18 is furthermore provided on the rotor shaft 14, between the compressor impeller 13 and the axial counter bearing 44. The sealing ring bush 18 is part of a compressor-side rotor-shaft oil seal 50 for sealing the bearing arrangement in the bearing housing 41 with respect to the compressor housing 31 of the exhaust-gas turbocharger 1. A further turbine-side rotor-shaft oil seal 51 for sealing the bearing arrangement in the bearing housing interior 46 of the bearing housing 41 with respect to the turbine housing 21 is arranged on the turbine side of the rotor shaft 14. For this purpose, a plurality of piston ring lands 52 with piston ring grooves 64 situated therebetween for accommodating corresponding piston rings (not illustrated here) is formed on the rotor shaft in a region between the turbine-side radial bearing 42 and the turbine impeller 12.

Further details of the turbocharger 1 will not be discussed any more specifically here in the first instance. It should be noted at this point that both the turbocharger 1 described in FIG. 1 and the turbocharger rotor 10 illustrated in FIG. 2 should be understood as being examples and can alternatively also have other configurations differing therefrom.

During the operation of the turbocharger, the rotor shaft typically rotates at very high speeds. During this process, high levels of kinetic energy are stored in the impellers, e.g. the turbine impeller but also the initially mentioned compressor impeller.

It has been recognized that, during the operation of the turbocharger, especially on testbed runs in the limiting range, which must be carried out for the design of the turbocharger or components of the turbocharger such as the turbocharger rotor, or indeed in the case of inadequate or even a lack of oil supply to the bearings, for example, the radial bearings and the rotor shaft may fail during the use of the turbocharger as intended.

In the case of a shaft break, for example, the impellers and, together with the latter, shaft fragments may escape from the bearing housing and possibly the exhaust-gas turbocharger in an axial direction. Owing to prevailing gas pressures, the turbine impeller, in particular, would be forced axially away from the centrally mounted shaft. If the shaft break is within the bearing housing, the piston rings of the rotor-shaft oil seals might leave their original axial position in the rotor shaft opening during this process, for example, resulting in the loss of a sealing effect. This would have inter alia the negative consequence that oil could escape in such quantities into the exhaust-gas zone that the internal combustion engine, into the oil circuit of which the turbocharger is coupled, must be shut down immediately in order to prevent even greater consequential damage, e.g. to an exhaust-gas after-treatment system. An escape of oil should also be prevented as far as possible in order to ensure at least emergency running properties of the system, where appropriate.

SUMMARY

One object underlying the invention is therefore to specify a concept for a turbocharger which contributes to reliable operation of a turbocharger, even in the event of failure of bearing components and, as a result of the latter, of the rotor shaft.

According to the example embodiments, there is disclosed a turbocharger for an internal combustion engine which has a bearing housing having a compressor side and a turbine side and a bearing housing interior, and also has a turbine housing, which is fixed mechanically on the bearing housing on the turbine side.

Furthermore, the turbocharger according to embodiments of the invention has a turbocharger rotor having a rotor shaft and a turbine wheel, wherein the rotor shaft of the turbocharger rotor is rotatably mounted in the bearing housing by means of at least two radial bearings, and the turbine wheel is arranged for conjoint rotation on the turbine end of the rotor shaft and in the turbine housing, and at least one turbine-side rotor-shaft oil seal for sealing the bearing housing interior with respect to the turbine housing, said seal being arranged on the rotor shaft and between the rotor shaft and the bearing housing, wherein, axially in relation to the rotor axis of rotation, the turbine-side rotor-shaft oil seal is arranged on the rotor shaft between a turbine wheel back, which faces the bearing housing, and a radial bearing closest to the turbine wheel, i.e., the turbine-side radial bearing.

The turbocharger according to embodiments of the invention include the fact that a predetermined breaking point is formed for the turbocharger rotor, said breaking point lying in a breaking point region which, in relation to the rotor axis of rotation, extends axially between the turbine wheel back and an axial end, facing the turbine wheel back, of the turbine-side rotor-shaft oil seal which is arranged furthest away from the turbine wheel.

The turbocharger described thus provides a mechanism which, in the event of failure of the rotor shaft, ensures a defined breaking point on the turbine side, outside the bearing housing, and thus keeps the turbine-side rotor-shaft oil seal in position in the rotor shaft opening in the bearing housing and thus maintains the sealing function thereof, at least to a large extent. For this purpose, a predetermined breaking point is provided which, with reference to the rotor axis of rotation in the axial direction, is not arranged in the bearing housing interior, that is to say not between the compressor-side rotor-shaft oil seals and the turbine-side rotor-shaft oil seal of the rotor shaft, but is arranged in a predetermined breaking region axially between the turbine wheel back and an axial end, facing the turbine wheel back, of the turbine-side rotor-shaft oil seal which is arranged furthest away from the turbine wheel.

In this way it is at any rate ensured, e.g. in the case of a multi-part seal arrangement, such as a labyrinth seal having a plurality of individual seals embodied as piston rings, for example, that one of the seals remains in the envisaged position, as a result retains its sealing effect and thus prevents an excessive escape of oil from the interior of the bearing housing into the turbine housing and the exhaust-gas zone.

Since the compressor-side part of the rotor shaft is held in position by an axial bearing, the rotor-shaft oil seals retain their axial position in the event of the rotor shaft failing at the predetermined breaking point, i.e. a shaft break, and, as a result, avoidance or at least a significant reduction of a loss of oil into the exhaust-gas zone is achieved.

Another effect of the predetermined breaking point according to the invention is that, as a result, a detached turbine wheel is given more freedom of movement and this plays a decisive role in dissipating kinetic energy. The provision of the predetermined breaking point in the region described makes it possible, in the event of rotor shaft failure, for the turbine impeller to wobble almost without or completely without a shaft stub and to make rubbing contact at many points in the turbine housing. This gives rise, for example, to additional forces which make the turbine wheel wobble in an almost random manner, resulting in many rubbing contact processes that very quickly dissipate kinetic energy and thus prevent the turbine impeller escaping from the turbine housing. In this way, the axial movement of the turbine wheel itself is limited and axial containment, e.g. keeping the components of the turbocharger together in the housing, is achieved.

In this way, it is advantageously possible to dispense with avoiding a shaft break under all circumstances by embodying the rotor shaft in a particularly robust way, e.g. in respect of materials and dimensions. As a further advantage, it is also not necessary to embody a wheel back disk and/or the blading of the turbine impeller with such thick material, and therefore the energy required to deform the impeller is sufficient to use up the rotational energy of the turbine impeller and thus prevent the turbine impeller escaping axially from the turbine housing together with a rotor shaft fragment. The possibility of dispensing with these measures by virtue of the invention contributes to greater dynamic response and thus to improved performance of the turbocharger, by virtue of lower inertia for example.

As an option, the impeller geometry is additionally configured in such a way that it does not fit through the available opening for the exhaust gas flow. For example, it is ensured that a deformation capacity and the energy dissipated in that case by the materials used is sufficient to allow deformation of the components only to the extent that, after converting the rotational kinetic energy into deformation energy, they cannot escape axially from the turbine housing.

The predetermined breaking point is, for example, a design element which is provided by mechanical or physical or design measures or configurations. In the case of damage or an overload, this design element will fail selectively and predictably or allows failure at a defined location in order to achieve the abovementioned functions and advantages. In other words, the concept should also be understood to mean that, by virtue of a design measure, the shaft breaks at a defined or specified predetermined breaking point, which does not necessarily have to be situated at the same axial location as the design measure. The predetermined breaking point can be a notch, a breaking point groove or a score mark, for example, but other design measures are also conceivable, as will also be described below. The design measure at the predetermined breaking point should be embodied in such a way that normal operation of the turbocharger, a normal operating mode, is not disrupted or impaired, even allowing for material fatigue.

An oil seal is understood to mean, for example, a labyrinth seal which has one or more piston rings and forms the seal together with piston ring lands and interposed grooves in the shaft and/or in the turbine wheel. The oil seal extends, for example, over an axial region of the rotor shaft, from an axial end facing away from the turbine wheel to a second axial end facing the turbine wheel. The oil seal can also be referred to as an oil seal section or oil seal region. For the turbocharger described, it is accordingly necessary that the predetermined breaking point should be arranged in such a way that at least one part of the seal should be maintained in each case in the event of failure. This should also be noted in the case of alternative seal configurations too.

According to one embodiment, axially in relation to the rotor axis of rotation, the predetermined breaking point is arranged at that point of the predetermined breaking point region of the rotor shaft which is subject to the highest stress during the operation of the turbocharger. The point which is subject to the highest stress is the point at which the greatest radial and/or axial forces arising due to operation, e.g. due to the inflow of the exhaust gas mass flow to the turbine wheel, act on the shaft. As a result, the shaft will, with sufficient predictability, fail first at the predetermined breaking point in the event of failure, e.g. in the case of overloading. It should be noted at this point that, depending on the configuration of the turbine wheel, the point which is subject to the highest stress can be determined with acceptable effort.

According to another embodiment, in relation to the rotor axis of rotation, the predetermined breaking point is arranged axially between the turbine wheel back and an axial end, facing the turbine wheel back, of the turbine-side rotor-shaft oil seal which is closest to the turbine wheel back.

According to another embodiment, in relation to the rotor axis of rotation, the predetermined breaking point is arranged axially in the immediate vicinity of the turbine wheel back of the turbine wheel, i.e. on that side of the turbine wheel which faces the rotor-shaft oil seal, directly at the transition between the turbine wheel back and the rotor shaft.

The abovementioned embodiments contribute to the above advantages and functions and advantageously further define an optimum region for the predetermined breaking point.

According to another embodiment, the turbine wheel has a cylindrical hub connection piece on the side of the turbine wheel facing the rotor shaft and thus also facing the rotor-shaft oil seal, said connection piece having a transitional region, embodied as a fillet, to the turbine wheel back, wherein the predetermined breaking point is arranged in the transitional region. In this transitional region, the centrifugal forces exerted by the turbine impeller and especially by the turbine wheel back have a particularly powerful effect during operation. This promotes the breaking of the shaft at said predetermined point. Furthermore, a temperature of the shaft during the operation of the turbocharger is increased owing to the proximity to the turbine wheel and hence to the hot exhaust gas mass flow. Here, the combination of a high temperature in conjunction with temperature gradients with respect to the typically lower temperature of the rotor shaft in the remaining region and the centrifugal forces has the effect that, in the event of failure, the rotor shaft breaks preferentially at this position of the rotor shaft, which coincides with the position of the most highly stressed point.

According to another embodiment, there is a weld seam in the region of the predetermined breaking point, by means of which weld seam the turbine wheel is connected to the rotor shaft. The rotor shaft is typically connected in a materially integral way to the turbine wheel by welding. By selectively shifting the weld seam to a suitable point, e.g. into the vicinity of or even into the transitional region between the rotor shaft and the turbine wheel back, it is possible to ensure that the shaft breaks in the region of the weld seam in the event of failure. In particular, the weld seam should in this case not be remote from the turbine wheel back since the stress in this region would not be sufficiently high.

According to another embodiment, a predetermined rubbing contact point between the rotor shaft and the bearing housing is provided in the region of the predetermined breaking point. In this case, a minimum radial spacing between the rotor shaft and a rotor shaft opening of the bearing housing is provided in the region of the rubbing contact point, with the result that, during normal operation, the rotor shaft (14) runs without contact within the rotor shaft opening and, in the event of failure of the radial bearings, initially rubs against the surrounding bearing housing in the region of the rubbing contact point. This causes selective overheating of the rotor shaft in this region, with the result that the rotor shaft breaks selectively at this point. The rubbing contact point only actually functions as a contact point in the event of failure, e.g. when there is bearing damage. If, for example, one or more bearings have been knocked out in the event of failure and the shaft is executing a relatively large wobbling movement, contact occurs between the rubbing contact point and the bearing housing. For example, the design of the radial gap between the rotor shaft and the rotor shaft opening of the bearing housing is predetermined in such a way in the region of the rubbing contact point that mechanical contact occurs at this point if the radial bearing assembly fails. Owing to the rubbing contact with the bearing housing, the rotation of the rotor shaft generates frictional heat at the contact point, resulting in overloading at this point and ultimately in the shaft breaking at the predetermined breaking point. It is thereby possible to continue to maintain bearing housing sealing, at least to a large extent. The rubbing contact point can also be referred to as a predetermined rubbing point.

Of course, it is also possible, where appropriate, to combine several of the abovementioned measures for pre-defining the predetermined breaking point in a suitable manner in order to enhance the desired effect. Thus, for example, a rubbing contact point can be provided in the region of a weld seam situated in the transitional region between the rotor shaft and the turbine wheel back. The arrangement of a breaking point groove in the immediate vicinity of a rubbing contact point also represents a combination which enhances the effect.

According to another embodiment, the oil seal is formed by at least one piston ring arranged in an encircling piston ring groove between two piston ring lands. In this case, the piston ring land which is closer to the turbine wheel back has, in relation to the rotor axis of rotation, the smallest radial gap relative to the surrounding rotor shaft opening of the bearing housing in order to form the rubbing contact point. This makes the advantages and functions mentioned possible in a particularly simple manner.

In addition, a corresponding breaking point groove can be arranged in the bottom of a piston ring groove of the rotor-shaft oil seal, for example, and the adjoining piston ring land can be designed as a rubbing contact point. This allows particularly precise predetermination of the predetermined breaking point of the rotor shaft.

The features and combinations of features of the embodiments of the subject matter according to the invention, which embodiments are specified above in the description or below in the figure description, insofar as they are not usable alternatively or are not mutually exclusive, can individually, partially or entirely also be used in mutual combination or so as to supplement one another in the development of the subject matter according to the invention without departing from the scope of the invention.

Below, particularly advantageous illustrative embodiments, details or developments of the invention will be discussed in more detail on the basis of the figures, even though the subject matter of the invention is not restricted to these examples.

DETAILED DESCRIPTION

Items of identical function and designation are denoted by the same reference signs throughout the figures.

Figure 1:
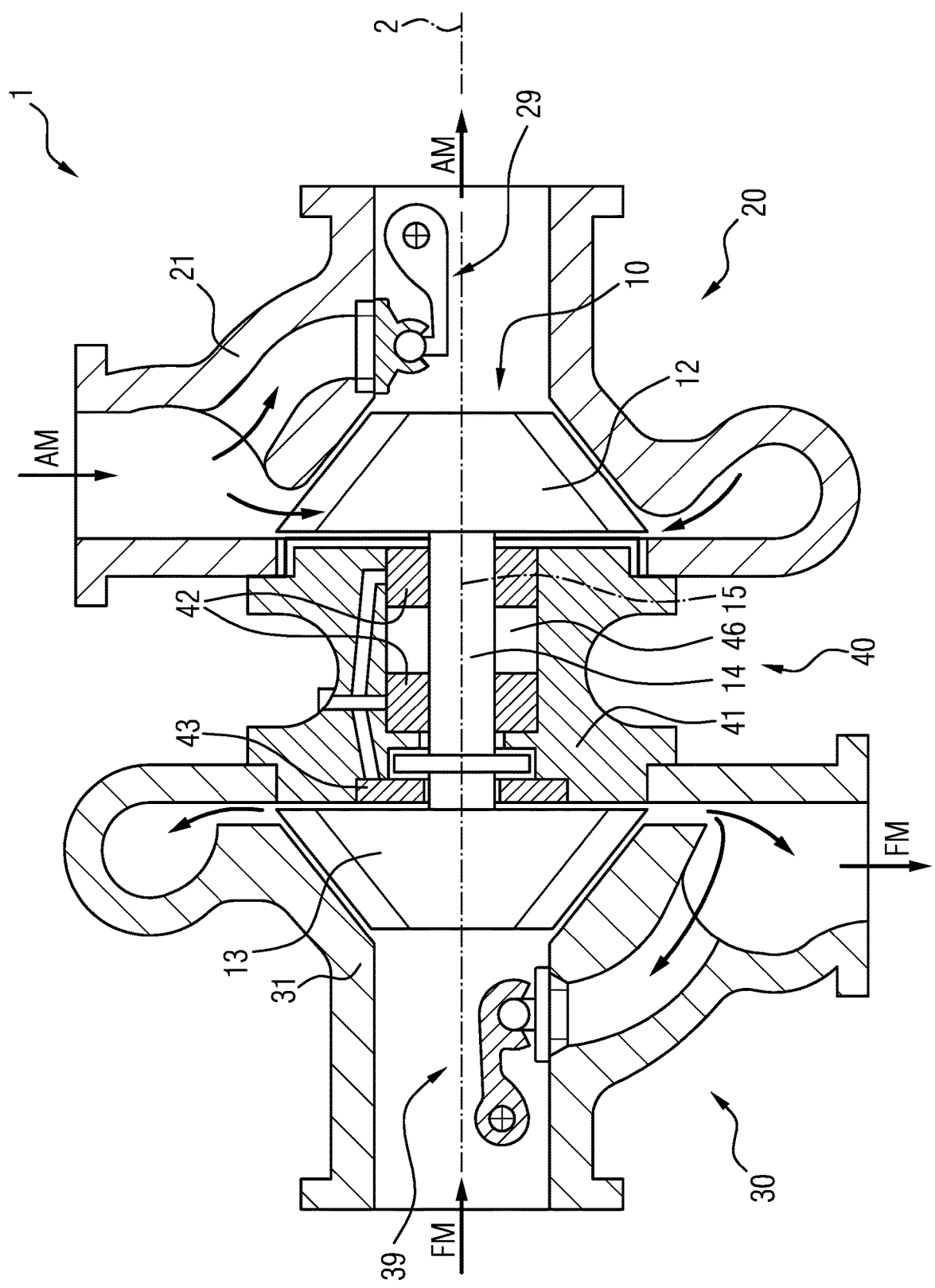
FIG. 1 shows a schematic sectional view of a turbocharger according to the prior art in order to explain a conventional illustrative embodiment of a turbocharger.
Figure 2:
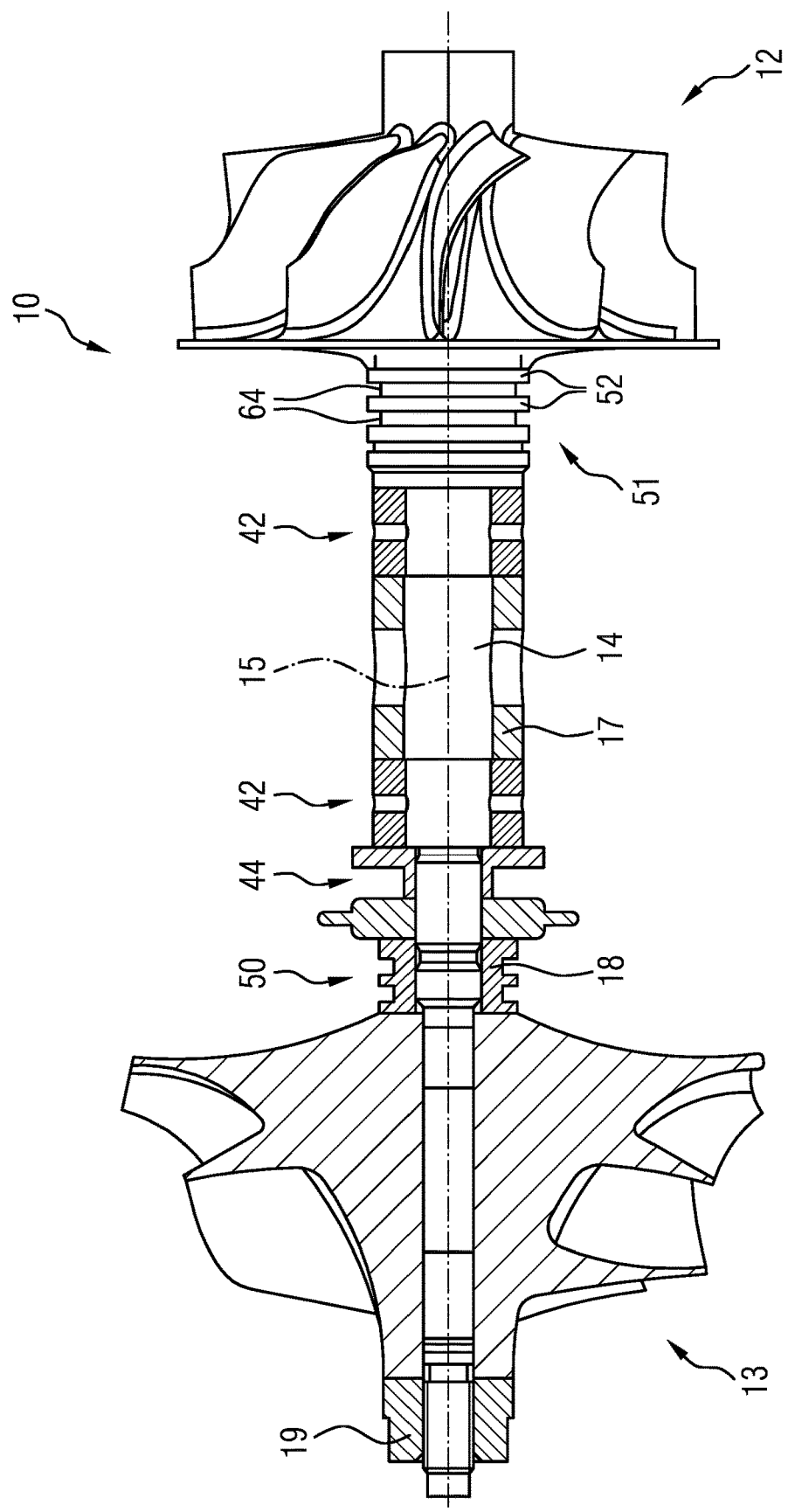
FIG. 2 shows a schematic sectional view of a turbocharger rotor according to the prior art in order to illustrate a conventional illustrative embodiment of a turbocharger rotor.

FIGS. 1 and 2 relate to the known prior art and have already been described in the introduction in order to explain the construction of a respective illustrative embodiment of a conventional turbocharger and of an associated turbocharger rotor.

Two illustrative embodiments of turbochargers 1 are described with reference to FIGS. 3 and 4, in which a predetermined breaking point 61 is provided on the turbocharger rotor 10, said predetermined breaking point allowing selective breaking of the rotor shaft 14 at this predetermined breaking point 61 in the event of failure of the radial bearings 42 of the turbocharger 1 or in the case of any other overloading of the turbocharger rotor 10.

Figure 3:
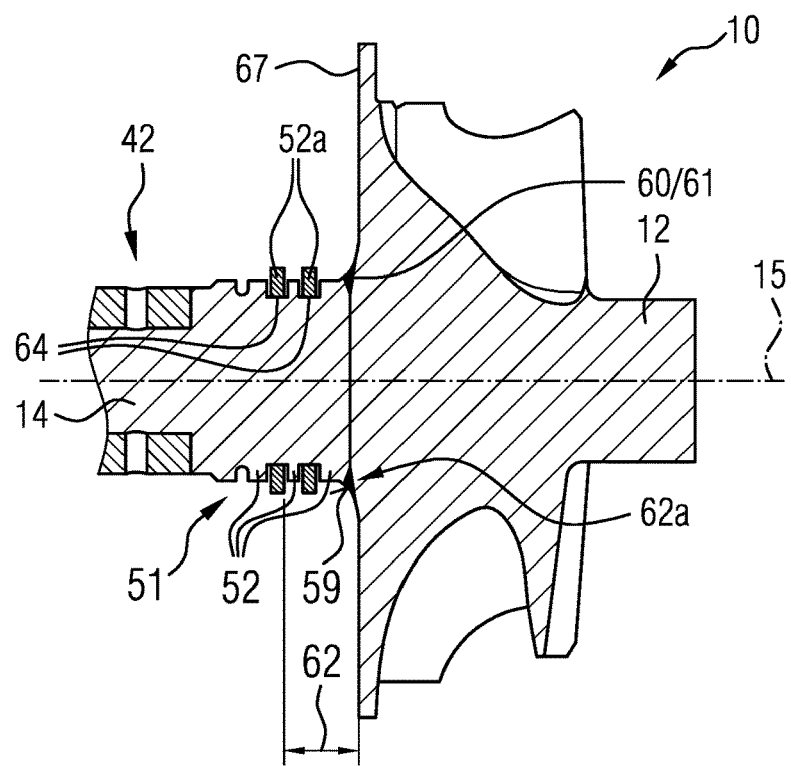
FIG. 3 shows a schematic partial sectional view of a turbocharger rotor (turbine impeller and rotor shaft part) of a turbocharger according to a first illustrative embodiment.

FIG. 3 relates to a first illustrative embodiment of a turbocharger 1, which basically corresponds to a turbocharger 1 with a turbocharger rotor 10 as per FIGS. 1 and 2, for example. FIG. 3 shows only a segment of the turbocharger rotor 10 schematically in section, this section emphasizing on an enlarged scale the turbine impeller 12, that part of the rotor shaft 14 which adjoins said impeller and is relevant here, and the transitional region between them.

Figure 4:
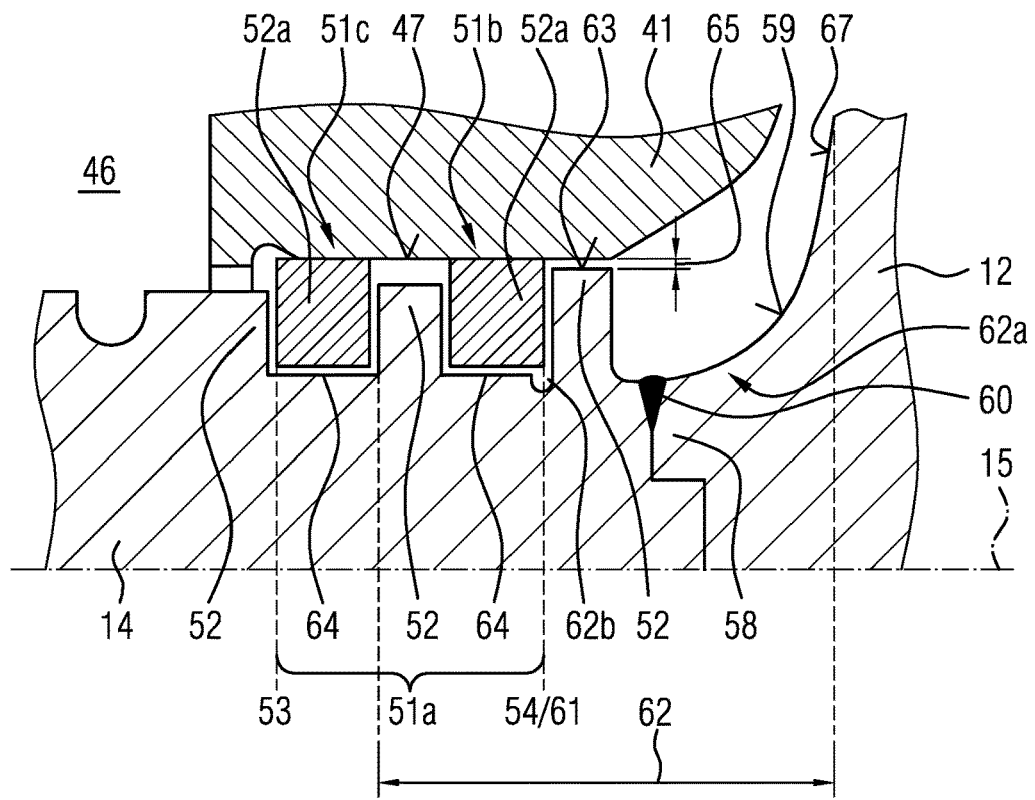
FIG. 4 shows a schematic partial sectional view of a rotor shaft, of the turbine impeller and of the bearing housing of a turbocharger according to a second illustrative embodiment.

As in FIG. 4, the turbine wheel 12 with its turbine wheel back 67 and the rotor shaft 14 with the turbine-side rotor-shaft oil seal 51 for sealing the bearing housing interior with respect to the turbine housing 21 can be seen in FIG. 3, said seal extending over a certain axial extent 51a in relation to the rotor axis of rotation 15 and having two piston rings 52a, which are each arranged in piston ring grooves 64 between two piston ring lands 52. When viewed as a whole, the turbine-side rotor-shaft oil seal 51 accordingly has a first axial end, which faces away from the turbine wheel back 67, i.e., is further away from the turbine wheel back 67, and a second axial end, which faces the turbine wheel back 67, i.e., is closer to the turbine wheel back 67. However, since each of the two piston rings 52a, when considered per se, can be regarded as an individual rotor-shaft oil seal, there is accordingly a rotor-shaft oil seal 51b which is arranged closest to the turbine wheel 12 and a rotor-shaft oil seal 51c which is arranged furthest away from the turbine wheel.

In this case, according to an embodiment, the breaking point region 62 extends axially, that is to say, in relation to the rotor axis of rotation (15), between the turbine wheel back (67) and an axial end, facing the turbine wheel back, of the turbine-side rotor-shaft oil seal (51c) which is arranged furthest away from the turbine wheel (12). That is to say, when viewed in the drawing, from the turbine wheel back to the right-hand axial end, i.e., the end facing the turbine wheel back, of the piston ring 52a which is arranged furthest away from the turbine wheel 12, i.e., of the piston ring on the left.

The turbine wheel 12 has a first axial end, which faces the rotor shaft 14, and a second axial end, which faces away from the rotor shaft 14. The turbine wheel 12 has a turbine wheel back 67, which is defined substantially as a disk, faces the rotor shaft 14 and thus also the motor-shaft oil seal 51 and extends substantially perpendicularly to the rotor axis of rotation 15. The largest diameter of the turbine wheel 12 is in the region of the turbine wheel back 67. A transitional region 59 in the form of a fillet is formed between the rotor shaft 14 and the turbine wheel 12. In the transitional region 59, therefore, the outer contour of the turbine wheel 12 has a concave curvature, e.g., a radius or an arc-shaped contour.

In an alternative embodiment, it is also possible for a further section, e.g. a step or a tapered section (not illustrated) to be formed in the transitional region 59 between the turbine wheel 12 and the rotor shaft 14.

In general, the turbine impeller 12 and the rotor shaft 14 are connected securely in a materially integral manner to form a single component, that is to say are welded by means of and along at least one encircling weld seam 60, as illustrated in FIGS. 3 and 4.

In the illustrative embodiment shown in FIG. 3, the weld seam 60 is arranged in the transitional region 59 between the first axial end of the turbine impeller 12 and the rotor shaft 14, which is directly adjacent in this case. In the first illustrative embodiment, the weld seam 60 is designed and positioned in such a way that it forms a weak point in the rotor shaft/turbine wheel assembly and thus simultaneously forms the predetermined breaking point 61 for the turbocharger rotor 10.

If the connection point between the turbine wheel 12 and the rotor shaft 14 and thus the weld seam 60 is situated in the transitional region 59, as illustrated in FIG. 3, it is located in the region of the most highly stressed point 62a between the rotor shaft 14 and the turbine wheel 12. Thus, both the weld seam 60 and the predetermined breaking point 61 are situated in the region of the turbine rotor 10 which is subject to the highest centrifugal forces and temperatures and thus forms the most highly stressed point 62a. In this way, the predetermined breaking point 61 is as it were defined in a redundant manner, greatly increasing the probability of breaking at precisely this predetermined breaking point 61 in the event of failure.

FIG. 4 shows another illustrative embodiment of a turbocharger 1. The turbocharger 1 corresponds very largely to the above descriptions, and therefore features in FIG. 4 that are provided with reference signs are not described again. Here too, only a segment of the turbocharger rotor 10 is shown schematically in section, this section emphasizing on an enlarged scale the turbine impeller 12, that part of the rotor shaft 14 which adjoins said impeller and is relevant here, and the transitional region between them. In addition, the segment of the bearing housing 41 in this region, having the bearing shaft opening 47, is also illustrated here.

Axially in relation to the rotor axis of rotation 15, on the side facing the rotor shaft 14, e.g., at the first axial end, the turbine wheel 12 has a cylindrical hub section, which is referred to below as hub connection piece 58. In a transitional region 59, which is in the form of a fillet, the hub connection piece 58 adjoins the turbine wheel back 67. Thus, in this case too, the outer contour of the turbine wheel 12 has a concave curvature, e.g., a radius or an arc-shaped contour, in the transitional region 59.

FIG. 4 once again illustrates the turbine-side rotor-shaft oil seal 51, which is formed by at least two piston rings 52a as already described above.

In this illustrative embodiment, a predetermined breaking point 61 is defined by a predetermined rubbing contact point 63. Here, the rubbing contact point 63 is predetermined by the radially encircling outer surface of the piston ring land 52 situated closest to the turbine wheel 12. The rubbing contact point 63 is surrounded directly by the inner surface of the rotor shaft opening 47 of the bearing housing 41, forming a minimum radial gap 65.

In the region of the abovementioned piston ring land 52 with the rubbing contact point 63, the rotor shaft 14 has the smallest radial clearance with respect to the bearing shaft opening 47 of the surrounding bearing housing 41. By virtue of this fact, the rotor shaft 14 comes into contact initially with the bearing housing 41 at the defined rubbing contact point 63 in the event of failure, e.g., of a radial bearing 42, and the resulting wobbling movement of the turbocharger rotor 10, and therefore the temperature of the rotor shaft 14 increases significantly in this axial region owing to the friction which occurs and it breaks in the breaking point region 62 of the rotor shaft 14. Accordingly, the rubbing contact point 63 can also be referred to as a predetermined rubbing point.

In order to define the predetermined breaking point 61 more clearly in the vicinity of the rubbing contact point 63, additional measures can be taken. In FIG. 4, a breaking point groove 62b is introduced for this purpose at the bottom of the nearest piston ring groove 64, immediately adjoining the piston ring land 52, said groove representing a diminution of the rotor shaft diameter and thus an additional weak point at a defined position, i.e., the predetermined breaking point 61. Of course, it is also possible for a breaking point groove 62b of this kind to be arranged on that side of the piston ring land 52 designed as a rubbing contact point 63 which faces the impeller back 67 and directly adjoining said land in the rotor shaft 14. Thus, in the example shown, both piston rings 52a would maintain their position in the rotor shaft opening 47 of the bearing housing 41 and thus their sealing function between the bearing housing interior 46 and the turbine housing 21 in the event of the rotor shaft breaking.

In another embodiment, the weld seam 60 can also be arranged as a weak point in the immediate vicinity of a rubbing contact point 63, with the result that the predetermined breaking point 61 is additionally defined by the weld seam.

Conversely, it is also possible, as it were combining the embodiments in FIGS. 3 and 4, for the rubbing contact point to be provided at some other position, e.g. in the transitional region 59 and thus at least close to the most highly stressed point 62a of the rotor shaft 14, thereby predetermining the failure of the rotor shaft 14, i.e., the breaking of the shaft, at this point.

The invention claimed is:

1. A turbocharger for an internal combustion engine, comprising:
　　a bearing housing having a compressor side and a turbine side and a bearing housing interior,
　　a turbine housing, which is fixed mechanically on the bearing housing on the turbine side;
　　a turbocharger rotor, which has a rotor shaft and a turbine wheel, wherein the rotor shaft of the turbocharger rotor is rotatably mounted in the bearing housing by means of at least two radial bearings, and the turbine wheel is arranged for conjoint rotation on a turbine end of the rotor shaft and in the turbine housing, and at least one turbine-side rotor-shaft oil seal for sealing the bearing housing interior with respect to the turbine housing, the seal being arranged on the rotor shaft and between the rotor shaft and the bearing housing, wherein, axially in relation to a rotor axis of rotation, the turbine-side rotor-shaft oil seal is arranged on the rotor shaft between a turbine wheel back, which faces the bearing housing, and a radial bearing closest to the turbine wheel, wherein a predetermined breaking point is formed for the turbocharger rotor, the breaking point lying in a breaking point region which, in relation to the rotor axis of rotation, extends axially between the turbine wheel back and an axial end, facing the turbine wheel back, of the turbine-side rotor-shaft oil seal which is arranged furthest away from the turbine wheel, the rotor shaft breaks at the predetermined breaking point in the event of a failure.

2. The turbocharger as claimed in claim 1, wherein there is a weld seam in the region of the predetermined breaking point, by means of which weld seam the turbine wheel is connected to the rotor shaft.

3. The turbocharger as claimed in claim 1, wherein, axially in relation to the rotor axis of rotation, the predetermined breaking point is arranged at that point of the breaking point region of the rotor shaft which is subject to a highest stress during operation of the turbocharger.

4. The turbocharger as claimed in claim 3, wherein there is a weld seam in the region of the predetermined breaking point, by means of which weld seam the turbine wheel is connected to the rotor shaft.

5. The turbocharger as claimed in claim 3, wherein a predetermined rubbing contact point between the rotor shaft and the bearing housing is provided in the region of the predetermined breaking point, wherein a smallest radial spacing between the rotor shaft and a rotor shaft opening of the bearing housing is provided in a region of the rubbing contact point, with the result that, during normal operation, the rotor shaft runs without contact within the rotor shaft opening and, in the event of failure of the radial bearings, initially rubs against the bearing housing in the region of the rubbing contact point.

6. The turbocharger as claimed in claim 1, wherein, axially in relation to the rotor axis of rotation, the predetermined breaking point is arranged between the turbine wheel back and the axial end, facing the turbine wheel back, of the turbine-side rotor-shaft oil seal which is closest to the turbine wheel back.

7. The turbocharger as claimed in claim 6, wherein there is a weld seam in the region of the predetermined breaking point, by means of which weld seam the turbine wheel is connected to the rotor shaft.

8. The turbocharger as claimed in claim 6, wherein a predetermined rubbing contact point between the rotor shaft and the bearing housing is provided in the region of the predetermined breaking point, wherein a smallest radial spacing between the rotor shaft and a rotor shaft opening of the bearing housing is provided in a region of the rubbing contact point, with the result that, during normal operation, the rotor shaft runs without contact within the rotor shaft opening and, in the event of failure of the radial bearings, initially rubs against the bearing housing in the region of the rubbing contact point.

9. The turbocharger as claimed in claim 1, wherein, axially in relation to the rotor axis of rotation, the predetermined breaking point is arranged in an immediate vicinity of the turbine wheel back of the turbine wheel.

10. The turbocharger as claimed in claim 9, wherein there is a weld seam in the region of the predetermined breaking point, by means of which weld seam the turbine wheel is connected to the rotor shaft.

11. The turbocharger as claimed in claim 9, wherein a predetermined rubbing contact point between the rotor shaft and the bearing housing is provided in the region of the predetermined breaking point, wherein a smallest radial spacing between the rotor shaft and a rotor shaft opening of the bearing housing is provided in a region of the rubbing contact point, with the result that, during normal operation, the rotor shaft runs without contact within the rotor shaft opening and, in the event of failure of the radial bearings, initially rubs against the bearing housing in the region of the rubbing contact point.

12. The turbocharger as claimed in claim 9, wherein the turbine wheel has a cylindrical hub connection piece on the side of the turbine wheel facing the rotor shaft, the connection piece having a transitional region, embodied as a fillet, to the turbine wheel back, wherein the predetermined breaking point is arranged in the transitional region.

13. The turbocharger as claimed in claim 1, wherein a predetermined rubbing contact point between the rotor shaft and the bearing housing is provided in the region of the predetermined breaking point, wherein a smallest radial spacing between the rotor shaft and a rotor shaft opening of the bearing housing is provided in a region of the rubbing contact point, with the result that, during normal operation, the rotor shaft runs without contact within the rotor shaft opening and, in the event of failure of the radial bearings, initially rubs against the bearing housing in the region of the rubbing contact point.

14. The turbocharger as claimed in claim 13, wherein the turbine-side rotor-shaft oil seal is formed by at least one piston ring arranged in an encircling piston ring groove between two piston ring lands, wherein, in relation to the rotor axis of rotation, the piston ring land which is closer to the turbine wheel back has a smallest radial gap relative to the rotor shaft opening of the bearing housing in order to form the rubbing contact point.

15. A turbocharger for an internal combustion engine, comprising:
a bearing housing having a compressor side, a turbine side and a bearing housing interior,
a turbine housing fixed mechanically on the bearing housing on the turbine side thereof;
a turbocharger rotor comprising a rotor shaft and a turbine wheel, wherein the rotor shaft is rotatably mounted in the bearing housing by at least two radial bearings, and the turbine wheel is arranged for conjoint rotation with the rotor shaft on a turbine end of the rotor shaft and in the turbine housing, and
at least one turbine-side rotor-shaft oil seal configured to seal the bearing housing interior with respect to the turbine housing, the seal being arranged on the rotor shaft and between the rotor shaft and the bearing housing, wherein, axially in relation to a rotor axis of rotation, the turbine-side rotor-shaft oil seal is arranged on the rotor shaft between a turbine wheel back, which faces the bearing housing, and a radial bearing of the at least two radial bearings that is closest to the turbine wheel,
wherein a predetermined breaking point is formed for the turbocharger rotor, the breaking point lying in a breaking point region which, in relation to the rotor axis of rotation, extends axially between the turbine wheel back and an axial end, facing the turbine wheel back, of the turbine-side rotor-shaft oil seal which is arranged furthest away from the turbine wheel, the rotor shaft breaks at the predetermined breaking point in the event of a failure.

16. The turbocharger as claimed in claim 15 wherein, axially in relation to the rotor axis of rotation, the predetermined breaking point is arranged in one of
    at that point of the breaking point region of the rotor shaft which is subject to a highest stress during operation of the turbocharger,
    between the turbine wheel back and the axial end, facing the turbine wheel back, of the turbine-side rotor-shaft oil seal which is closest to the turbine wheel back, and
    in an immediate vicinity of the turbine wheel back of the turbine wheel.

17. The turbocharger as claimed in claim 15, wherein the region of the predetermined breaking point includes a weld seam which connects the turbine wheel to the rotor shaft.

18. The turbocharger as claimed in claim 15, wherein the turbine wheel includes a cylindrical hub connection piece on the side of the turbine wheel facing the rotor shaft, the cylindrical hub connection piece having a transitional region, formed as a fillet, to the turbine wheel back, wherein the predetermined breaking point is arranged in the transitional region.

19. The turbocharger as claimed in claim 15, wherein a predetermined rubbing contact point between the rotor shaft and the bearing housing is provided in the region of the predetermined breaking point, wherein a smallest radial spacing between the rotor shaft and a rotor shaft opening of the bearing housing is provided in a region of the rubbing contact point such that during normal operation, the rotor shaft runs without contact within the rotor shaft opening and, in the event of failure of the radial bearings, initially rubs against the bearing housing in the region of the rubbing contact point.

20. The turbocharger as claimed in claim 19, wherein the turbine-side rotor-shaft oil seal is formed by at least one piston ring arranged in an encircling piston ring groove between two piston ring lands, wherein, in relation to the rotor axis of rotation, the piston ring land which is closer to the turbine wheel back has a smallest radial gap relative to the rotor shaft opening of the bearing housing in order to form the rubbing contact point, the smallest radial gap comprising the smallest radial spacing.

* * * * *